(No Model.) 2 Sheets—Sheet 1.
F. COLLINS.
PHOTOGRAPHIC CAMERA ATTACHMENT.
No. 341,886. Patented May 18, 1886.
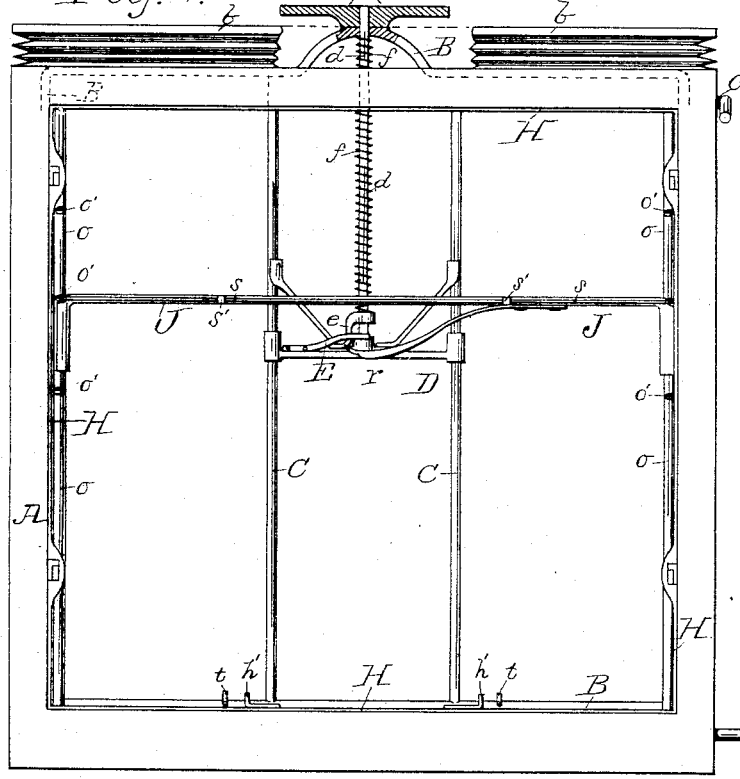
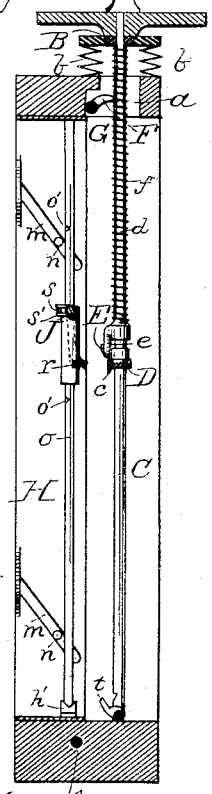
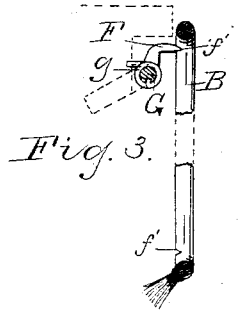
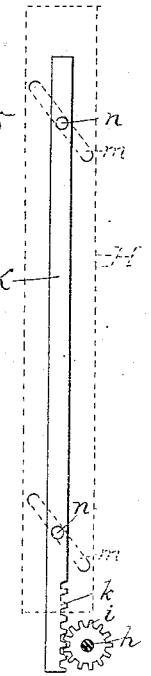
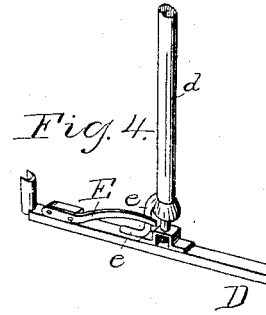
Witnesses:
H. F. Wackendorff
Jno. W. Sickels.
Inventor:
Frederick Collins
By James H. Coyne
attorney

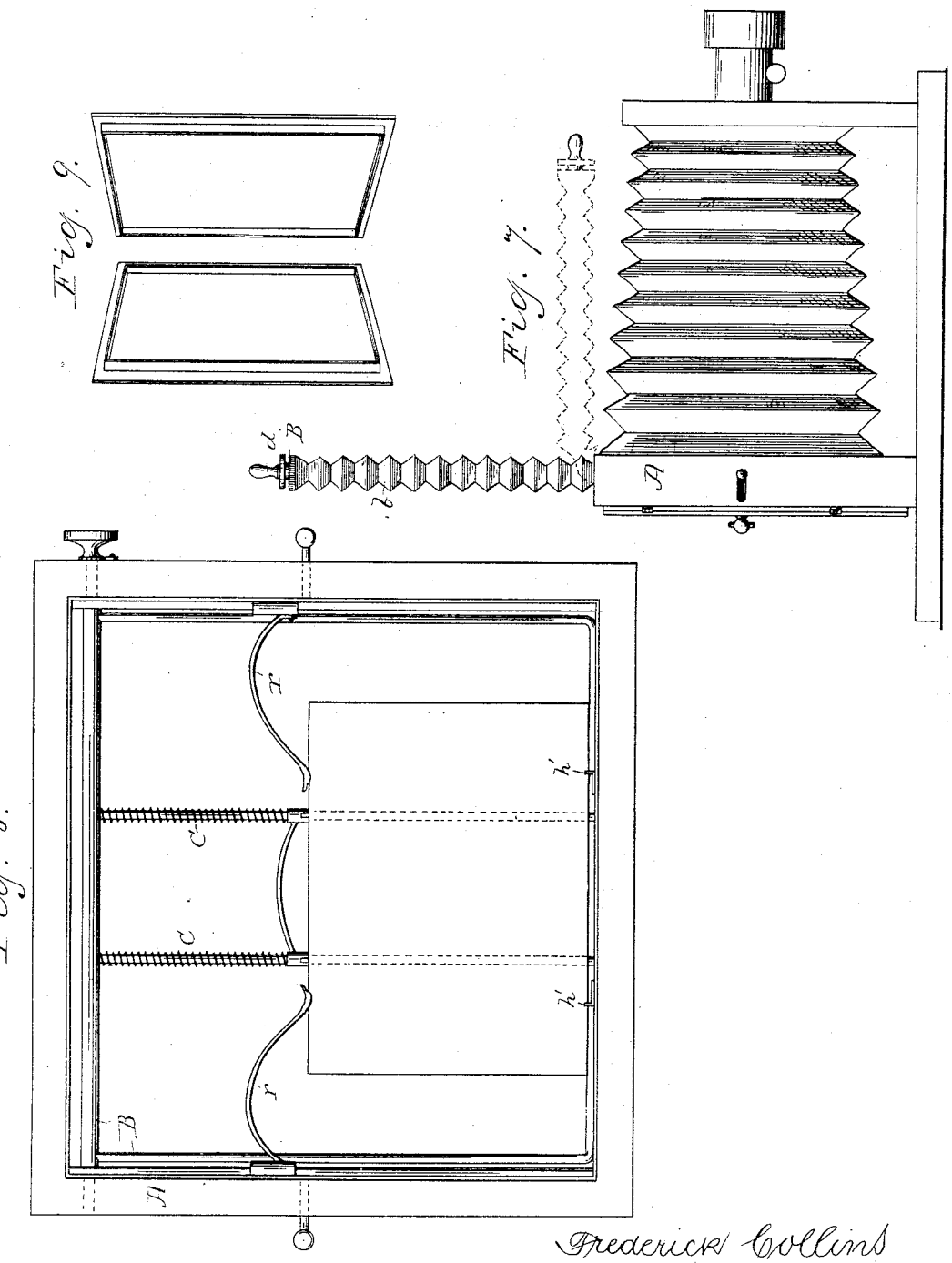

UNITED STATES PATENT OFFICE.

FREDERICK COLLINS, OF ST. JOSEPH, MICHIGAN.

PHOTOGRAPHIC-CAMERA ATTACHMENT.

SPECIFICATION forming part of Letters Patent No. 341,886, dated May 18, 1886.

Application filed July 21, 1885. Serial No. 172,192. (No model.)

*To all whom it may concern:*

Be it known that I, FREDERICK COLLINS, of St. Joseph, in the county of Berrien and State of Michigan, have invented certain new and useful Improvements in Photographer's Camera Attachments; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to open and hold cases containing sensitive plates within the dark chamber of a photographer's camera by means which can be operated from the outside thereof, substantially as hereinafter described, and as illustrated in the drawings, in which—

Figure 1 is a rear elevation of my invention, showing the same separate from the camera. Fig. 2 is a longitudinal central section of the same. Figs. 3, 4, 5, and 6 are detail views thereof. Fig. 7 is a side elevation of a photographer's camera, showing modifications of parts of my invention. Fig. 8 shows modification of the devices for holding the sensitive-plate case and modified forms of devices for operating the same, and Fig. 9 shows on a small scale the sensitive-plate case.

In the drawings, A represents a rectangular frame, occupying the same position in a camera that a slide-box does in those in current use. It is closed at the rear by folding doors, a screen, or a slide, and has in its upper transverse bar a transverse slot, $a$. Designed to slide or reciprocate vertically in this slot $a$, and in vertical mortises in the inner surfaces of the vertical sides of said frame A, is the open rectangular slide B, having its center length arched up above the top cross-bar of frame A, with a suitable handle on top thereof for convenience of the photographer in lifting or lowering the same. As it is necessary to keep the light from entering the box when this slide B is raised or lowered, I secure to the same a bellows, $b$, the upper back of which is just below the plane of the hand-grasp attached thereto, and the fabric of which is secured to the top cross-bar of frame A, around and contiguous to the confines of slot $a$. Connecting the top and bottom cross-frames of the slide and parallel to each other are the vertical guide-posts C C. Suspended and capable of sliding vertically between, and having its ends bifurcated to surround or pass to either side of posts C, is the clamping-head D. The rear under edge of this head is provided with a projecting ledge or bead, $c$, and on its upper surface, at its center of length, it is provided with suitable bearings for the heel of the carrying-rod $d$. This carrying-rod runs vertically parallel to and midway between posts D, up through the center of length of the top cross-bar of the slide, through the center of the hand-grasp thereof, and terminates just above the latter. On this rod, near the heel thereof, is affixed the S-arm $e$, which can be oscillated outward when desired by slightly turning rod $d$, as will hereinafter be more fully explained.

Secured to head D is a spring, E, the tension of which is increased when the arm is oscillated outward against it, and the pressure of which, when the rod is released, returns the same and said arm to their normal position. Coiled around rod $d$, between the boss thereon, from which arm $e$ projects and the upper cross-frame of slide, is the spring $f$. This spring presses the head D down, and when it is raised by means of rod $d$, and then released, returns both said head and rod to their first position.

In order that the slide may remain up when lifted to its upward limit, and held securely down when within frame A, I make notches $f'$ $f'$ in the vertical parts of the slide near their upper and lower ends.

Engaging the lower notches when the slide B is raised and the upper notches when the slide is down are the pawls F, fast on or near the ends of the transverse rock-shaft G, situate near the slot $a$. About its center of length it is provided with a spring, $g$, which keeps the points of the pawls F always bearing against the vertical pieces of said slide, so that when opposite the notches they will be urged into them. One end of this rock-shaft extends through the side posts of frame A, and is turned laterally to afford means for oscillating it to oscillate the pawls F, and release the slide in order that it might be raised or lowered. Fitting snugly within the frame A, just to the rear of the slide, is the rectangular frame H. This frame has longitudinal reciprocal motion within said frame A, which it derives through the medium of a transverse shaft, $h$, placed below said frame H, having pinions $i\ i$ fast thereon, which engage racks $k\ k$ on the lower ends of the vertically-reciprocating bars K, placed flush against the back of frame H in suitable grooves made in the frame A to accommodate the same. Projecting from these bars K through oblique slots $m\ m$ made in frame H are the friction-studs $n\ n$. Thus when the bars are moved upward the frame is urged in toward the slide, and when said bars are moved downward the said frame is withdrawn horizontally from the same. Placed vertically against the vertical sides of frame H are the guides $o\ o$, placed on the same transverse plane, and provided at regular intervals with notches $o'$. Movable and adjustable vertically on these guides is the transverse bar J, which carries the spring-catch $r$, and is be sides provided with a spring-bar, $s$, which is held away from said bar between the lugs $s'\ s'$, and has its ends turned laterally inward toward and into the notches $o'$ in the guides $o$. When the spring-bar $s$ is pressed in toward bar J at its center of length, the ends thereof will be withdrawn from the notches $o'\ o'$ and readjusted, as and for the purpose hereinafter explained.

Secured and extending obliquely upward toward frame H from the lower cross-bar of the slide are fingers $t\ t$, and located on the bottom transverse part of frame H, to correspond in position to fingers $t\ t$, are the lugs $h'\ h'$, having V-cuts in their upper surfaces or ends.

The end of spring-catch $r$ is provided with an upwardly-turned finger-like formation, which when arm $e$ is oscillated outward is caught thereby, so that when the rod $d$ is lifted said arm $e$ catches the finger and raises spring $r$. The end of this spring is provided with a V-cut in its under surface.

As set forth in the statement of this specification, the object of my invention is to hold and open within the dark chambers of cameras cases holding sensitive plates. These cases, as shown in Fig. 9, consist of a box and cover, the projecting flanges from which are removed back from the edges, and the flange from the cover of which laps over and incloses the flange from the box. The sensitive plate is placed and held by suitable means within the box part of this case, and the cover closes over the same in such manner as to effectually keep out the light.

The door, slide, or screen of the back of frame A is opened and the case placed in such position in the same that the flanges of the box rest in the V-cuts of the lugs $h'\ h'$, and then frame H is moved as near as possible to the slide and until the flanges of the cover of the case rest on and over fingers $t\ t$. The arm $e$ is then oscillated and the spring-catch $r$ lifted, so that the case may be brought to a vertical position against the posts C of the slide B. The rod $d$ then being released, the spring-catch $r$ snaps down onto the flange of the box, so that said flange enters the V-cut therein, and the bead $c$, projecting from head D, holds the flange of the cover. By so manipulating shaft $h$ as to draw downward the bars K the frame H is withdrawn from the slide, thus opening the case. The slide is then lifted vertically to remove the cover from before the sensitive plate in the box of the case. When the slide is lifted to its vertical limits, the frame H is then urged forward to bring the sensitive plate in focus, and then the negative is taken in the usual manner. In order to focus this apparatus with my improved invention therein, a piece of white silk may be stretched on the side of the slide exposed to the lens; or a focusing-glass or other suitable means may be adopted.

If desired, instead of the shaft $h$ and pinions $i\ i$ and bars K, a stud may be projected through longitudinally-elongated slots in frame A from the sides of frame H far enough to be grasped by the hands, and thus worked with relation to the slide.

Instead of slide B, a frame similar in construction thereto may be oscillated from its upper corners upward into the dark chamber from before the sensitive plate. If this construction were adopted, the means for raising and lowering head D would have to be so modified as to come within the camera.

I prefer in tourists' cameras to so construct the slide and bellows used in conjunction therewith that said slide, instead of remaining perpendicular when raised, can be lifted clear out of slot $a$ and laid horizontally either to the front or rear. The object of this construction is that when the wind blows the operator may place it down in such position as to prevent its being the means of shaking the camera.

If desired, the bar J may be dispensed with and a spring-catch, $r$, secured to the sleeves, to which the bar is now secured, which slide on the guides $o\ o$; and instead of a head, D, a couple of sleeves may be placed on the posts C, with a spring similar to $f$ surrounding said posts and pressing them downward. Said sleeves could be provided with suitable fingers to hold the flange of the cover of the sensitive-plate case.

What I claim as new is—

1. In a photographer's camera, the combination, with a frame having means for holding the cover of a case for sensitive dry-plates, as described, of a rectangular frame having means for holding the box of said case, as and for the purpose set forth.

2. In a photographer's camera, the combination, with a vertically-reciprocating slide having means thereon for holding thereto the cover of a case, as described, of a longitudinally-reciprocating frame having means for holding the box of said case.

3. The combination, in a photographer's camera, of a rectangular frame, A, having a transverse slot in its upper cross-bar, of a vertically-reciprocating slide, B, a bellows, $b$, and frame H, as set forth.

4. The combination, in a photographer's camera, of a vertically-reciprocating slide, B, having notches $f'$ near the upper and lower ends, respectively, of the vertical frames thereof, with pawls F, shaft G, and spring $g$.

5. The combination, in a camera, with frame A, and a rectangular frame, H, having a longitudinal motion therein, of the slide B, having vertical posts C C, head D, and rod $d$, substantially as set forth.

6. The combination, in a camera, with frame A, and a rectangular open frame, H, having a longitudinal motion therein, of the slide B, having vertical posts C C, head D, rod $d$, and spring $f$.

7. The combination, in a photographer's camera, with frame A, rectangular frame H, guides $o$, and spring-catch $r$, adjustable vertically thereon, of the slide or frame B, having vertical posts C, head D, rod $d$, and arm $e$ projecting therefrom, as and for the purpose set forth.

8. The combination, in a camera, with frame A, frame H, guides $o$ $o$, and springs $r$, adjustable vertically thereon, of the slide or frame B, having posts C, head D, provided with bead $c$, rod $d$, spring $f$, arm $e$, projecting from near the heel of said rod, and fingers $t$ $t$.

9. The combination, in a camera, with frame A, slide B, having means therein to hold the cover of a case, as described, of the rectangular frame H, having guides $o$ $o$, bar J, adjustable vertically thereon, and spring $r$.

10. The combination, in a camera, with frame A, slide B, having means therein to hold the cover of a case, as described, of the rectangular frame H, having oblique slots $m$ $m$, spring $r$, lugs $h'$ $h'$, bars K, having studs $n$ $n$ and provided with racks $k$ near their lower ends, pinions $i$, and shaft $h^2$.

11. The combination, in a camera, with the frame A and slide or frame B, having posts C C therein, head D, rod $d$, arm $e$, and spring E, of the longitudinally-reciprocating frame H, and spring-catch $r$, adjustable vertically therein.

12. The combination, in a camera, with frame A, slide or frame B, having means therein to hold the cover of a case, as described, of the rectangular frame H, having a longitudinal reciprocal motion, guides $o$ $o$, bar J, spring-catch $r$, attached thereto, spring-bar $s$, having its ends turned laterally and adapted to enter notches $o'$ in guides $o$ $o$.

In testimony that I claim the foregoing as my own I hereunto affix my signature in presence of two witnesses.

FREDERICK COLLINS.

Witnesses:
JAMES H. COYNE,
FRANK D. THOMASON.